United States Patent
Wong et al.

(10) Patent No.: US 9,654,946 B2
(45) Date of Patent: May 16, 2017

(54) SHORT MESSAGE SERVICE MOBILE ORIGINATED/MOBILE TERMINATED WITHOUT MOBILE STATION INTERNATIONAL SUBSCRIBER DIRECTORY NUMBER (MSISDN) IN INTERNET PROTOCOL MULTIMEDIA SUBSYSTEM (IMS)

(71) Applicant: Nokia Corporation, Espoo (FI)

(72) Inventors: Curt Wong, Sammamish, WA (US); Jari Mutikainen, Lepsama (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 52 days.

(21) Appl. No.: 14/388,000

(22) PCT Filed: Apr. 8, 2013

(86) PCT No.: PCT/FI2013/050380
§ 371 (c)(1),
(2) Date: Sep. 25, 2014

(87) PCT Pub. No.: WO2013/153277
PCT Pub. Date: Oct. 17, 2013

(65) Prior Publication Data
US 2015/0045074 A1 Feb. 12, 2015

Related U.S. Application Data

(60) Provisional application No. 61/622,166, filed on Apr. 10, 2012.

(51) Int. Cl.
*H04W 4/00* (2009.01)
*H04W 4/14* (2009.01)
*H04L 12/58* (2006.01)

(52) U.S. Cl.
CPC ........... *H04W 4/14* (2013.01); *H04L 12/5895* (2013.01)

(58) Field of Classification Search
CPC ........... H04W 8/26; H04W 4/14; H04W 4/12; H04W 80/04; H04W 88/184;
(Continued)

(56) References Cited

U.S. PATENT DOCUMENTS

2005/0002407 A1    1/2005 Shaheen et al.
2005/0007984 A1*   1/2005 Shaheen ............. H04L 65/1016
                                                              370/338
(Continued)

FOREIGN PATENT DOCUMENTS

RU    2273096 C2    3/2006
RU    2424635 C2    7/2011
(Continued)

OTHER PUBLICATIONS

3GPP TR 23.863 V1.1.0 (Feb. 2012): 3rd Generation Partnership Project; Technical Specification Group Services and System Aspects; Support of Short Message Service (SMS) in IMS without MSISDN; Stage 2 (Release 11), hereinafter TR23.863.*
(Continued)

*Primary Examiner* — Ronald Eisner
(74) *Attorney, Agent, or Firm* — Squire Patton Boggs (US) LLP

(57) ABSTRACT

Methods, apparatuses, and computer program products for submitting and/or delivering a SMS between user equipment without MSISDN are provided. One method includes storing the SIP-URI and IMSI for a device sending a SMS. The method may further include receiving a SMS from the sending device. In an embodiment, the TP-DA field of the MO-SMS is filled with value(s) that indicates the recipient UE is addressed without MSISDN, the R-URI is set to PSI,
(Continued)

and the "to header" is set to the receiving device's SIP URI. The method may include retrieving the receiving device's SIP URI from the "to header," and querying the receiving device's HSS for the IMSI and routing information of the receiving device. The method may then include delivering the SMS to the receiving device directly or delivering the SMS to the receiving device via the SMSC.

9 Claims, 9 Drawing Sheets

(58) Field of Classification Search
CPC ....... H04W 12/06; H04W 8/04; H04W 88/16; H04W 88/18; H04W 8/12; H04W 4/18; H04W 76/022; H04W 4/24; H04W 8/183; H04W 92/02; H04W 12/02
USPC .............................................. 455/414.1–417
See application file for complete search history.

(56) References Cited

U.S. PATENT DOCUMENTS

| | | | |
|---|---|---|---|
| 2005/0282565 A1* | 12/2005 | Shaheen ............. | H04L 12/5895 455/466 |
| 2007/0010265 A1 | 1/2007 | Henderson et al. | |
| 2008/0090597 A1 | 4/2008 | Celik et al. | |
| 2010/0177771 A1* | 7/2010 | Buckley .................. | H04L 12/66 370/352 |
| 2011/0161441 A1 | 6/2011 | Haruna et al. | |
| 2013/0316677 A1* | 11/2013 | Aharon ................. | H04W 12/02 455/411 |
| 2014/0258425 A1* | 9/2014 | Dietz ...................... | H04L 51/04 709/206 |

FOREIGN PATENT DOCUMENTS

| | | |
|---|---|---|
| RU | 2428809 C2 | 9/2011 |
| WO | 03/103308 A1 | 12/2003 |
| WO | 2004/099919 A2 | 11/2004 |
| WO | 2008/088889 A1 | 7/2008 |
| WO | 2011/126505 A1 | 10/2011 |

OTHER PUBLICATIONS

"3rd Generation Partnership Project; Technical Specification Group Services and System Aspects; Support of Short Message Service (SMS) in IMS Without MSISDN; Stage 2 (Release 11)", 3GPP TR 23.863, v1.1.0, Feb. 2012, pp. 1-58.
"3rd Generation Partnership Project; Technical Specification Group Services and System Aspects; Architecture Enhancements to Facilitate Communications With Packet Data Networks and Applications (Release 11)", 3GPP TS 23.682, v11.0.0, Mar. 2012, pp. 1-24.
"3rd Generation Partnership Project; Technical Specification Group Services and System Aspects; Support of Short Message Service (SMS) Over generic 3GPP Internet Protocol (IP) Access; Stage 2 (Release 11)", 3GPP TS 23.204, v11.1.0, Sep. 2011, pp. 1-53.
"3rd Generation Partnership Project; Technical Specification Group Core Network and Terminals; Technical Realization of the Short Message Service (SMS) (Release 11)", 3GPP TS 23.040, v11.1.0, Mar. 2012, pp. 1-202.
"3rd Generation Partnership Project; Technical Specification Group Core Network and Terminals; Support of SMS Over IP Networks; Stage 3 (Release 11)", 3GPP TS 24.341, V11.0.0, Sep. 2011, pp. 1-30.
LG Electronics, "Alternatives for SMS Delivery for MSISDN-Less IMS UE", SA WG2 Meeting #88, S2-115062, Agenda Item: 7.3.2, Nov. 14-18, 2011, pp. 1-15.
Nokia Siemens Networks, Nokia, "UE to UE Delivery in IMS Without MSISDN", SA WG2 Meeting #90, S2-121506, Agenda Item: 9.4.1, Apr. 16-20, 2012, pp. 1-4.
International Search Report and Written Opinion received for corresponding Patent Cooperation Treaty Application No. PCT/FI2013/050380, dated Aug. 29, 2013, 14 pages.
Office action received for corresponding Vietnam Patent Application No. 1-2014-03208, dated Apr. 7, 2015, 1 page.
Office action received for corresponding Canadian Patent Application No. 2869116, dated Jul. 24, 2015, 4 pages.
Office action received for corresponding Mexican Patent Application No. MX/a/2014/012032, dated Aug. 14, 2015, 2 pages of office action and no pages of office action translation available.
Office action received for corresponding Korean Patent Application No. 2014-7031422, dated Nov. 4, 2015, 4 pages of office action and no pages of office action translation available.
"The Assessment for Key Issue 3", SA WG2 Meeting #89, S2-120842, Agenda Item: 7.3.2, ZTE, Feb. 6-10, 2012, 2 pages.
Extended European Search Report received for corresponding European Patent Application No. 13775830.6, dated Nov. 12, 2015, 8 pages.
Office action received for corresponding Japanese Patent Application No. 2015-504993, dated Jan. 5, 2016, 6 pages of office action and 7 pages of office action translation available.
"CR, MO Delivery Example", 3GPP TSG-CT1 Meeting #42bis, C1-061261, Agenda item: 8.6, Nokia, Jul. 4-7, 2006, pp. 1-5.
Office action received for corresponding Singapore Patent Application No. 1120140627.2, dated Jan. 6, 2016, 7 pages.
Search Report received for corresponding Russian Patent Application No. 2014142797, dated Jan. 20, 2016, 4 pages.
Office action received for corresponding Vietnam Patent Application No. 1-2014-03208, dated Jan. 27, 2015, 1 pages.
Office Action dated Feb. 15, 2016, issued in corresponding MX application No. MX/a/2014/012032.
Office Action dated Jan. 26, 2016, issued in corresponding RU application No. 2014142797 (with English translation).
Patent Examination Report No. 1 dated Apr. 27, 2016 corresponding to Australian Patent Application No. 2013246791.
Patent Examination Report No. 2, dated Jun. 14, 2016, issued in corresponding Australian Patent Application No. 2013246791.
Office Action dated May 20, 2016, issued in corresponding Mexican Application No. MX/a/2014/012032.
Patent Examination Report No. 3, dated Jul. 28, 2016, issued in corresponding Australian Patent Application No. 2013246791.
Japanese Office Action dated Aug. 30, 2016, issued in corresponding Japanese Patent Application No. 2015-504993.
Examination Search Report for corresponding Canadian Application No. 2,869,116, dated Aug. 24, 2016. pp. 1.
Written Opinion issued for corresponding Singapore Application No. 11201406272S, dated Jul. 1, 2016. pp. 1-4.
"3rd Generation Partnership Project (3GPP) TSG-CT1 Meeting #42bis, C1-061261, Montreal Canada" Jul. 4-7, 2006. pp. 1-2.
Substantive Examination Report dated Mar. 8, 2017 corresponding to Philippines Patent Application No. 1/2014/502181.
Office Action dated Mar. 10, 2017 corresponding to Canadian Patent Application No. 2,869,116.

* cited by examiner

SHORT MESSAGE SERVICE MOBILE ORIGINATED/MOBILE TERMINATED WITHOUT MOBILE STATION INTERNATIONAL SUBSCRIBER DIRECTORY NUMBER (MSISDN) IN INTERNET PROTOCOL MULTIMEDIA SUBSYSTEM (IMS)

RELATED APPLICATION

This application was originally filed as Patent Cooperation Treaty Application No. PCT/FI2013/050380 filed Apr. 8, 2013 which claims priority benefit to U.S. Provisional Patent Application No. 61/622,166, filed Apr. 10, 2012.

CROSS-REFERENCE TO RELATED APPLICATIONS

This application claims priority to U.S. Provisional Application Ser. No. 61/622,166 filed on Apr. 10, 2012. The contents of this earlier filed application are hereby incorporated by reference in their entirety.

BACKGROUND

Field

Embodiments of the invention generally relate to wireless communications networks, such as, but not limited to, the Universal Mobile Telecommunications System (UMTS) Terrestrial Radio Access Network (UTRAN) and/or Long Term Evolution (LTE) Evolved UTRAN (E-UTRAN).

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN) no RNC exists and most of the RNC functionalities are contained in the eNodeB (enhanced Node B).

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE is also expected to improve spectral efficiency in 3G networks, allowing carriers to provide more data and voice services over a given bandwidth. Therefore, LTE is designed to fulfill future needs for high-speed data and media transport in addition to high-capacity voice support. Advantages of LTE are, for example, high throughput, low latency, FDD and TDD support in the same platform, an improved end-user experience, and a simple architecture resulting in low operating costs.

Further releases of 3GPP LTE (e.g., LTE Rel-10, LTE-Rel-11) are targeted towards future international mobile telecommunications advanced (IMT-A) systems, referred to herein for convenience simply as LTE-Advanced (LTE-A). LTE-A is directed toward extending and optimizing the 3GPP LTE radio access technologies. A goal of LTE-A is to provide significantly enhanced services by means of higher data rates and lower latency with reduced cost. LTE-A will be a more optimized radio system fulfilling the international telecommunication union-radio (ITU-R) requirements for IMT-Advanced while keeping the backward compatibility.

The internet protocol (IP) multimedia subsystem (IMS) is an architectural framework for delivering IP multimedia services. In order to facilitate integration with the Internet, IMS uses internet engineering task force (IETF) protocols, such as session initiation protocol (SIP), wherever possible. IMS is designed to assist in the access of voice and multimedia applications from wireless terminals or devices.

SUMMARY

One embodiment is directed to a method including storing, by a gateway, a session initiation protocol uniform resource identifier (SIP-URI) and/or International Mobile Subscriber Identity (IMSI) of a device sending a short message service (SMS) message. The method may further include receiving the SMS message from the sending device, retrieving a session initiation protocol uniform resource identifier (SIP-URI) for a receiving device that is a recipient of the SMS message. The SIP-URI of the receiving device may be retrieved from the "to header" of the SMS message. The method may further include querying a home subscription server (HSS) of the receiving device for the International Mobile Subscriber Identity (IMSI) and routing information of the receiving device, and delivering the SMS message to the receiving device using the International Mobile Subscriber Identity (IMSI) and the routing information. In an embodiment, at least one of the sending device or the receiving device do not have a mobile station international subscriber directory number (MSISDN).

Another embodiment is directed to an apparatus. The apparatus includes at least one processor and at least one memory comprising computer program code. The at least one memory and the computer program code configured, with the at least one processor, to cause the apparatus at least to store a session initiation protocol uniform resource identifier (SIP-URI) and/or International Mobile Subscriber Identity (IMSI) of a device sending a short message service (SMS) message, receive the SMS message from the sending device, and retrieve a session initiation protocol uniform resource identifier (SIP-URI) for a receiving device that is a recipient of the SMS message. The SIP-URI of the receiving device is retrieved from the "to header" of the SMS message. The apparatus may be further caused to query a home subscription server (HSS) of the receiving device for the International Mobile Subscriber Identity (IMSI) and routing information of the receiving device, and deliver the SMS message to the receiving device using the International Mobile Subscriber Identity (IMSI) and the routing information. In one embodiment, at least one of the sending device or the receiving device do not have a mobile station international subscriber directory number (MSISDN).

Another embodiment is directed to a computer program, embodied on a computer readable medium, wherein the computer program is configured to control a processor to perform a process. The process includes storing a session initiation protocol uniform resource identifier (SIP-URI) and/or International Mobile Subscriber Identity (IMSI) of a device sending a short message service (SMS) message. The process may further include receiving the SMS message from the sending device, retrieving a session initiation protocol uniform resource identifier (SIP-URI) for a receiving device that is a recipient of the SMS message. The SIP-URI of the receiving device may be retrieved from the "to header" of the SMS message. The process may further include querying a home subscription server (HSS) of the receiving device for the International Mobile Subscriber Identity (IMSI) and routing information of the receiving device, and delivering the SMS message to the receiving device using the International Mobile Subscriber Identity (IMSI) and the routing information. In an embodiment, at least one of the sending device or the receiving device do not have a mobile station international subscriber directory number (MSISDN).

Another embodiment is directed to a method including constructing, by a user equipment, a short message service (SMS) message. The constructing comprises filling a transfer protocol destination address (TP-DA) field of the SMS with a value configured to indicate that a receiving device that is a recipient of the SMS message is addressed without a mobile station international subscriber directory number (MSISDN), setting the request uniform resource identifier (R-URI) to a public service identity (PSI) or the address of the short message service center, and setting a "to header" of the SMS to a session initiation protocol uniform resource identifier (SIP URI) of the receiving device. The method may then include sending the SMS to a gateway.

Another embodiment is directed to an apparatus. The apparatus includes at least one processor and at least one memory comprising computer program code. The at least one memory and the computer program code configured, with the at least one processor, to cause the apparatus at least to construct a short message service (SMS) message. The constructing comprises filling the a transfer protocol destination address (TP-DA) field of the SMS with a value configured to indicate that a receiving device that is a recipient of the SMS message is addressed without a mobile station international subscriber directory number (MSISDN), setting the R-URI to a public service identity (PSI), and setting a "to header" of the SMS to a session initiation protocol uniform resource identifier (SIP URI) of the receiving device. The apparatus may be further caused to send the SMS to a gateway.

Another embodiment is directed to a computer program, embodied on a computer readable medium, wherein the computer program is configured to control a processor to perform a process. The process includes constructing a short message service (SMS) message. The constructing comprises filling a transfer protocol destination address (TP-DA) field of the SMS with a value configured to indicate that a receiving device that is a recipient of the SMS message is addressed without a mobile station international subscriber directory number (MSISDN), setting the R-URI to public service identity (PSI), and setting a "to header" of the SMS to a session initiation protocol uniform resource identifier (SIP URI) of the receiving device. The process may then include sending the SMS to a gateway.

Another embodiment is directed to a method including receiving from a gateway, by a user equipment, a session initiation protocol (SIP) message including a short message service (SMS) message sent from a sending device without a mobile station international subscriber directory number (MSISDN), and decoding the SMS message using a p-asserted-identity header to determine the identity of the sending device.

Another embodiment is directed to an apparatus. The apparatus includes at least one processor and at least one memory comprising computer program code. The at least one memory and the computer program code configured, with the at least one processor, to cause the apparatus at least to receive from a gateway a session initiation protocol (SIP) message including a short message service (SMS) message sent from a sending device without a mobile station international subscriber directory number (MSISDN), and to decode the SMS message using a p-asserted-identity header to determine the identity of the sending device.

Another embodiment is directed to a computer program, embodied on a computer readable medium, wherein the computer program is configured to control a processor to perform a process. The process includes receiving from a gateway a session initiation protocol (SIP) message including a short message service (SMS) message sent from a sending device without a mobile station international subscriber directory number (MSISDN), and decoding the SMS message using a p-asserted-identity header to determine the identity of the sending device.

BRIEF DESCRIPTION OF THE DRAWINGS

For proper understanding of the invention, reference should be made to the accompanying drawings, wherein.

DETAILED DESCRIPTION

Short message service (SMS) delivery over the internet protocol (IP) multimedia subsystem (IMS) has been specified since 3GPP Release 7 with TS 23.204. The routing of SMS, even for IMS devices, is still based on mobile station international subscriber directory number (MSISDN). As a result, the SMS over IP architecture defined in TS 23.204 requires the use of recipient's MSISDN in order to route the SMS properly. The sender's MSISDN is also needed in order for the recipient's device to identify the sender and for replying back to this SMS.

In 3GPP Release 11, the 3GPP began a study, in TR 23.863, on how to support SMS in IMS without MSISDN. One topic in this study is the communication via SMS between MSISDN-less IMS user equipment (UEs). Without MSISDN, the "SMS over IP" requires some fundamental changes to routing, functional node behavior, and the devices' procedure. Therefore, embodiments of the invention are related to SMS delivery without the use of MSISDN.

In TR 23.863, there is one alternative proposed in section 5.2.1 for "Direct delivery with IP-SM-GW interworking." In summary, the following ideas are proposed in that solution:
1. The sending user equipment (UE) embeds its sender's session initiation protocol-uniform resource identifier (SIP-URI) and recipient's SIP-URI within the SMS payload.
2. In the SMS protocol level, the sending UE fills the transfer protocol destination address (TP-DA) with a pre-defined "MT short code" for indicating to the internet protocol short message gateway (IP-SM-GW) that the receiving UEs identity is in the SMS payload, the routing protocol originating address (RP-OA) is filled with a pre-defined "MO short code" for indicating to the IP-SM-GW that the sending UE's identity is in the SMS payload.
3. The IP-SM-GW retrieves the receiving UE's session initiation protocol uniform resource identity (SIP-URI) from the SMS payload and queries the home subscription server (HSS) for routing to the terminating serving call session control function (S-CSCF).
4. The IP-SM-GW fills in the RP-OA and TP-OA with its own address and sends the SIP MESSAGE with R-URI and To headers=receiving UE's SIP URI to the terminating S-CSCF.
5. The terminating device parses the SMS payload and finds the sending UE's SIP URI and uses that for SMS reply.

The above-described procedure, however, has several disadvantages. For example, the SMS payload effectively becomes much smaller (e.g., 160 characters−sender's+recipient's SIP URI). This could affect charging as one SMS may now require splitting into multiple parts (i.e., SMS segmentation). Another disadvantage is that the pre-defined short code needs to be provisioned to the UE. Interworking with non-access stratum (NAS) based SMS is missing. Storing and forwarding is also not supported unless more impact is done to IP-SM-GW. It should be noted that storing and forwarding is functionality provided by the short message service center (SMSC) that is not utilized by this proposal.

Figure 1A:
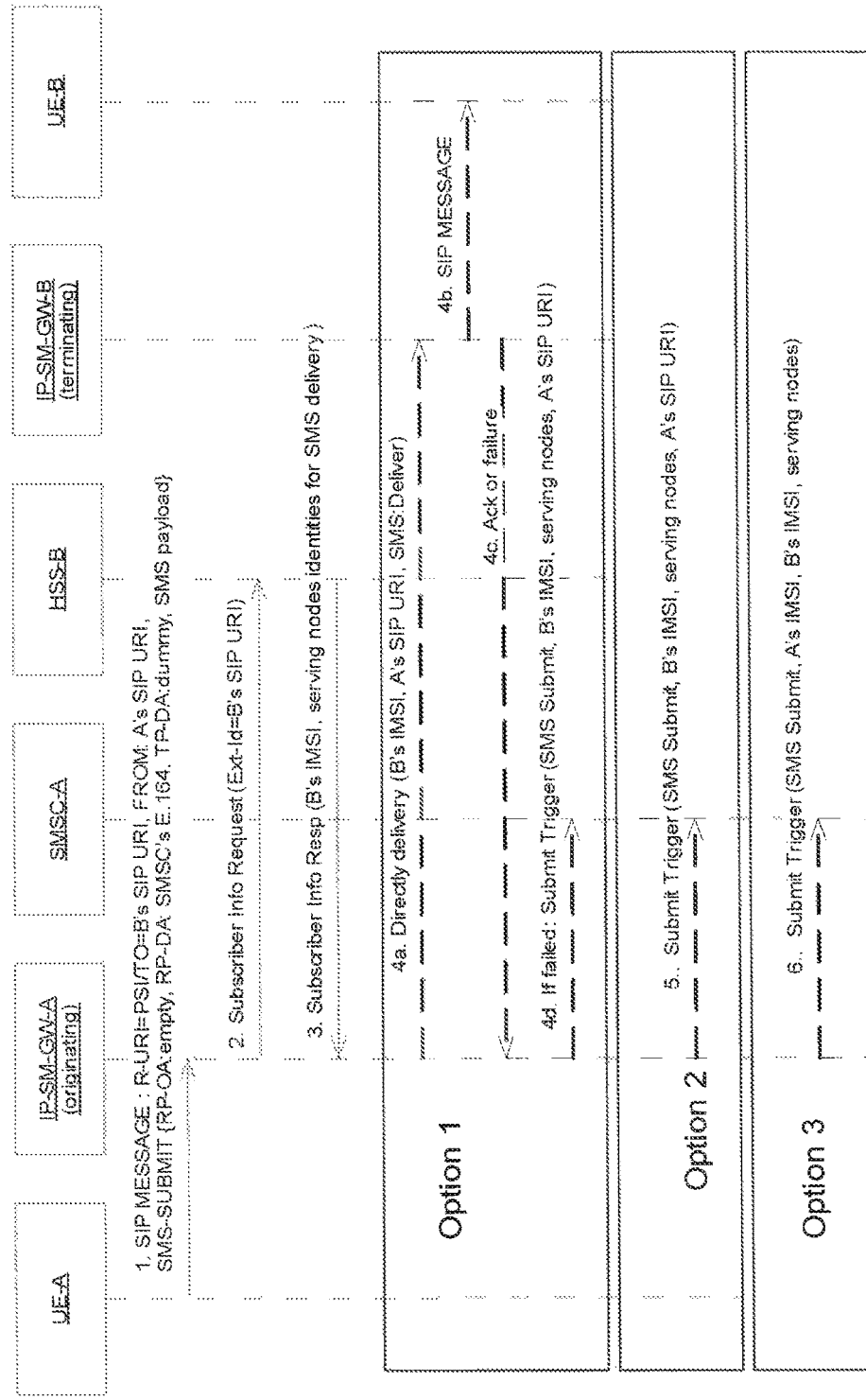
FIG. 1a illustrates a signaling diagram according to an embodiment.

FIG. 1a illustrates a signaling diagram for submitting a SMS from a sending device (e.g., UE-A) without MSISDN, according to an embodiment of the invention. As illustrated in FIG. 1a, at step 1, IP-SM-GW-A is included as part of the 3rd party registration. The IP-SM-GW-A is aware that a party (e.g., UE-A and/or UE-B) does not have a MSISDN, and it stores UE-A's SIP-URI (IMS public user identity (IMPU) and IMS private user identity (IMPI)) or international mobile subscriber identity (IMSI) it received from the S-CSCF as part of 3$^{rd}$ party registration. If IP-SM-GW-A did not receive IMPU/IMSI and/or SIP-URI as part of the 3$^{rd}$ party registration procedure, it can query the HSS of UE-A to obtain this information. UE-A constructs a SMS (e.g., mobile originated (MO)-SMS or mobile terminated (MT)-SMS) and the SMS may be delivered to the IP-SM-GW-A based on existing procedures.

Figure 1B:
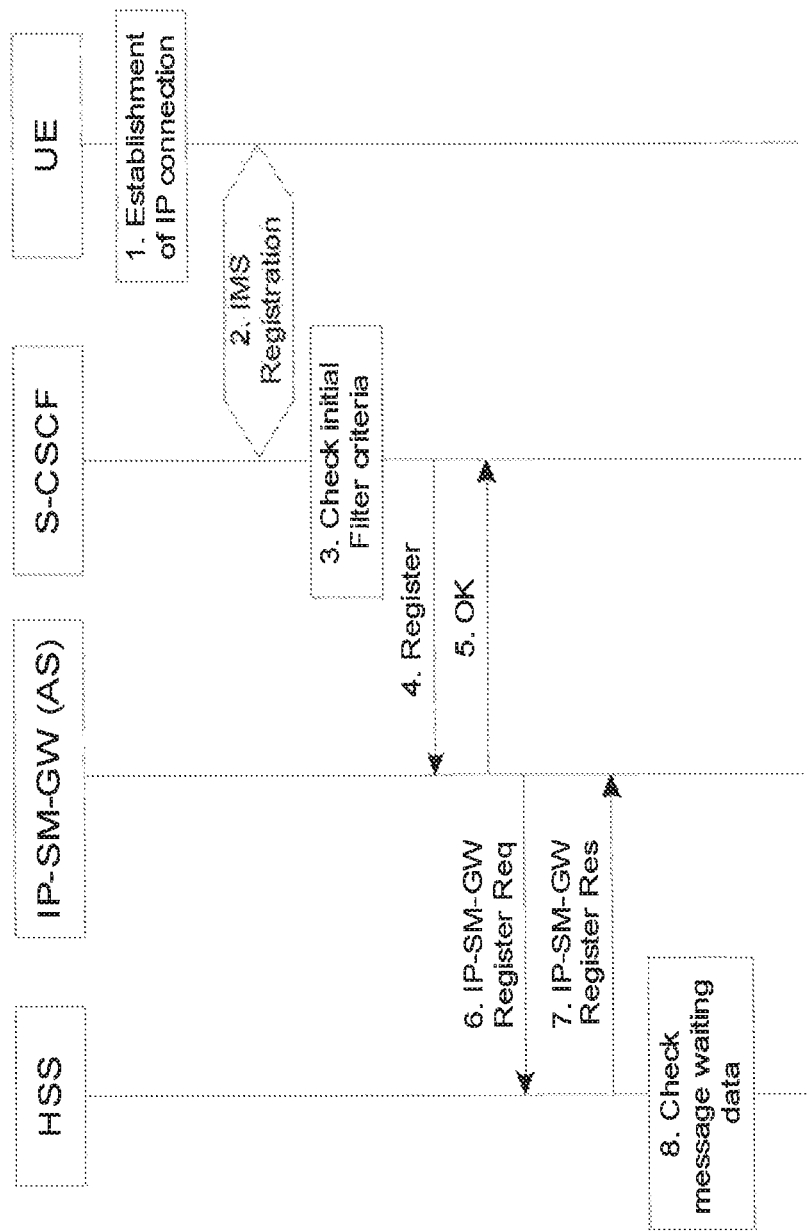
FIG. 1b illustrates a signaling diagram according to an embodiment.

FIG. 1b illustrates an example of a signaling diagram of the registration procedure, according to one embodiment. As illustrated in FIG. 1b, at 1, the UE establishes an IP connection. At 2, any time after the establishment of the IP connection, the UE registers at the S-CSCF according to the IMS registration procedures. Then, at 3, the S-CSCF checks the initial filter criteria retrieved from the HSS during the IMS registration procedure. After successful IMS registration and based on the retrieved initial filter criteria, at 4, the S-CSCF informs the IP-SM-GW (AS) about the registration of the user. The IMSI may also be informed to the IP-SM-GW (AS) when there is no MSISDN in the UE's IMS subscription profile. At 5, the IP-SM-GW (AS) returns OK message to the S-CSCF and, at 6, the IP-SM-GW (AS) sends an IP-SM-GW Register Request to the HSS. The HSS stores the received IP-SM-GW address if necessary or, for MT-SMS without MSISDN, uses it as an indication that the UE is available to be accessed via the IMS to trigger an Alert service center message if the message waiting flag is set. At 7, the HSS responds to the IP-SM-GW (AS) with an IP-SM-GW Register Response. The IP-SM-GW gets the IMPU (SIP URI) for SMS delivery without TEL-URI from registration event package. The IP-SM-GW Register Response can include the SC address to be used for this user in the subscriber data. After successful registration of the IP-SM-GW address at the HSS, at 8, the HSS checks whether message waiting data are stored and alerts all SCs.

Returning to FIG. 1a, according to an embodiment, since the receiving device (UE-B) does not have a MSISDN, the UE-A fills the TP-DA field with a dummy value (e.g., 000000s). In this embodiment, UE-A sets the R-URI (request uniform resource identifier) to the public service identity (PSI) (for example, short message service center address) and sets the To header to UE-B's SIP-URI in the MESSAGE. The proxy call session control function (P-CSCF), for example, fills the default URI of UE-A to p-asserted-identity before sending the MESSAGE to the serving call session control function (S-CSCF). Since, in this embodiment, the UE-A does not have a MSISDN, it also does not have a tel URI and, therefore, the default URI is UE-A's SIP URI. The S-CSCF executes the iFC and forwards the MESSAGE to the IP-SM-GW-A.

As further illustrated in FIG. 1a, at step 2, the IP-SM-GW-A retrieves the SIP URI for UE-B from the To Header. The IP-SM-GW-A queries the home subscriber server (HSS) of UE-B (HSS-B) for UE-B's IMSI and SMS routing info. Essentially, the "Subscriber Info Request" message defined in TS 23.682 may be reused for a machine type triggering message between the HSS and the machine type communication interworking function (MTC-IWF) with the clarification that the external identity which is defined in TS 23.682, is a device specific identifier, is here set to contain the IMS public user identity (IMPU), i.e. SIP URI. Therefore, when the IP-SM-GW queries the HSS with the SIP URI as an external identifier for UE-B, the HSS returns the IMSI-B. Then, at step 3, the HSS returns UE-B's IMSI and its current serving node for SMS delivery to UE-B.

According to one embodiment, as shown in option 1 of FIG. 1a, the policy allows the IP-SM-GW-A to directly deliver the SMS to UE-B via IP-SM-GW-B. In step 3 discussed above, the IP-SM-GW-A detects that the TP-DA has a dummy value and that the To header contains a SIP URI, therefore, in step 4a, the IP-SM-GW-A may attempt a direct delivery via IMS domain, without going to SMSC at first. The IP-SM-GW-A is aware of the address of IP-SM-GW-B based on the step 3. The IP-SM-GW-A constructs a SIP MESSAGE with {p-asserted-identity:A's SIP-URI, To:B's SIP-URI, R-URI=IP-SM-GW-B, SMS Deliver} {TP-OA=dummy, RP-OA=IP-SM-GW-A, RP-DA=B's IMSI, sms payload}. In step 4b, the IP-SM-GW-B adds its own URI to the topmost p-asserted-identity, to ensure the UE-B sends the delivery report to the IP-SM-GW-B. The IP-SM-GW-B delivers the SIP MESSAGE to UE-B by using the UE-B's SIP URI, which it received in the To header field. UE-B stores and removes the topmost URI in p-asserted-identity, and uses it as an R-URI for a delivery report. The remaining URIs in the p-asserted-identity contains the UE- A's SIP URI. If UE-B is not reachable via IMS, the IP-SM-GW-B may attempt the delivery via circuit switched (CS) or Serving GPRS Support Node (SGSN). This is based on current procedure, except that the IP-SM-GW needs to convert the UE-B's SIP URI to IMSI-B via a HSS query.

In step 4c, a success or failure notice is sent back to IP-SM-GW-A. The UE-B may be temporarily out of coverage or the memory may be full, which would result in a failure of delivery. In step 4d, the IP-SM-GW-A submits this SMS to UE-A's SMSC for storing and forwarding function.

According to some embodiments, such as options 2 or 3 illustrated in FIG. 1a, it is assumed that directly delivery is not allowed so that signaling must go through the SMSC first. For example, the IP-SM-GW-A submits the SMS to SMSC-A. In on embodiment, the IP-SM-GW-A reuses the Submit Trigger defined in TS 23.682 for machine type triggering message between the SMSC and MTC-IWF (T4 reference point), along with the new addition for option 2 (step 5) in which the UE-A's SIP URI is also included. For option 3, as shown in step 6, only the UE-A's IMSI is included, and no enhancements to T4 are required.

It should be noted that, while FIG. 1a illustrates two separate gateways (e.g., IP-SM-GW-A and IP-SM-GW-B), some embodiments may only include a single gateway.

Figure 1C:
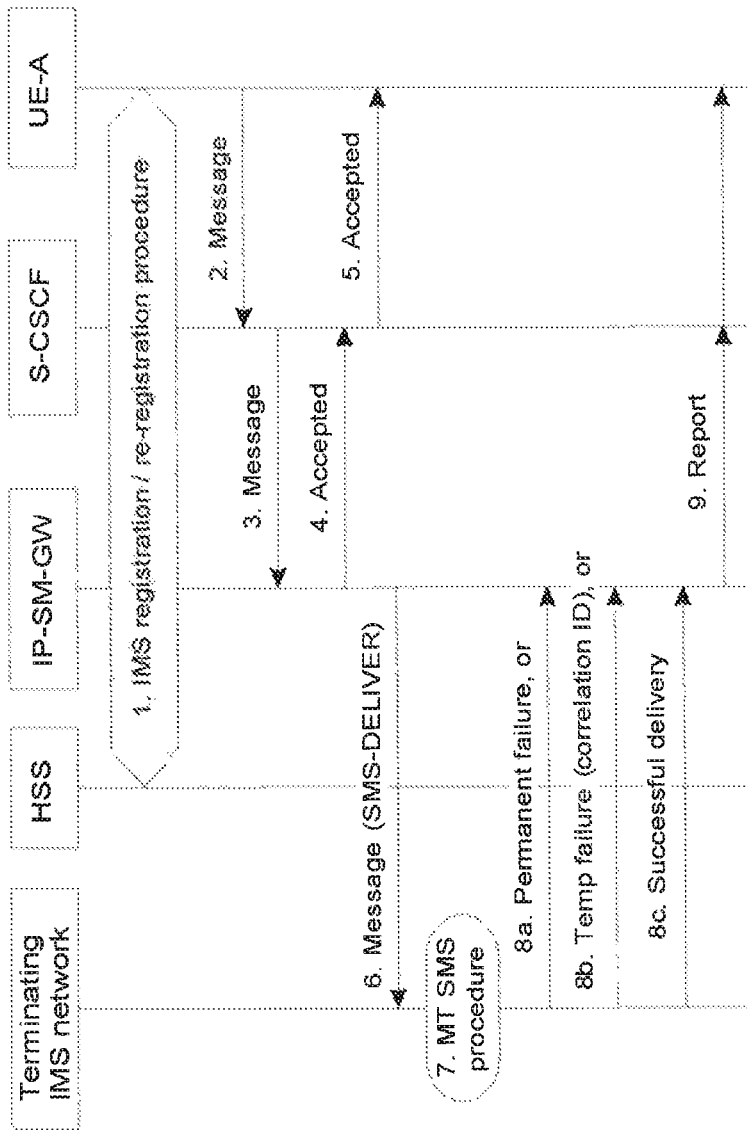
FIG. 1c illustrates a signaling diagram according to an embodiment.

FIG. 1c illustrates an example of a signaling diagram depicting a SMS message mobile originating procedure without MSISDN, according to one embodiment. As illustrated in FIG. 1c, at 1, the UE-A registers to S-CSCF according the IMS registration procedure. At 2, UE-A may submit the encapsulated Short Message (SMS-SUBMIT, SC Address) to the S-CSCF using an appropriate SIP method. Since the recipient UE does not have MSISDN, UE-A may fill the TP-DA field with value that indicates recipient UE is addressed without MSISDN, and indicate recipient's SIP URI in SIP MESSAGE (e.g., UE-A sets the R-URI to PSI (SMSC address) and the To header with recipient's SIP URI in the MESSAGE). The P-CSCF may fill the UE-A's default URI to p-asserted-identity before sending the MESSAGE to S-CSCF. Then, at 3, the S-CSCF may forward the encapsulated Short Message (SMS-SUBMIT, SC Address) to IP-SM-GW (AS) based on stored iFC. The IP-SM-GW (AS) may acknowledge the SIP message, at 4. The SIP message acknowledgement may then be forwarded, at 5, by the S-CSCF to UE-A.

In one embodiment, the IP-SM-GW may perform service authorization based on the stored subscriber data. The IP-SM-GW may check whether the subscriber is authorized to use the short message service (e.g. Operator Determined Barring settings), similar to the authorization performed by MSC/SGSN in case the Short Message is delivered via CS or PS domain. In addition, the IP-SM-GW may also check whether the user is authorised to use the encapsulated Short Message delivery via IMS. If the result of service authorization is negative, the IP-SM-GW may not forward the message, and may return the appropriate error information to the UE in a failure report. Otherwise, the IP-SM-GW (AS) extracts the Short Message (SMS-SUBMIT) and constructs the SMS-DELIVER and, at 6, sends it towards the terminating IMS network. At 7, the terminating IMS network tries to deliver the SM toward the designated recipient. At 8a, 8b, or 8c, the terminating IMS network responds with one of the following: 8a) terminating IMS network refuses or does not allow SMS delivery with MSISDN-less operation by sending back a permanent error; 8b) Terminating IMS network is not able to deliver the SM to designated recipient and returns a correlation ID to allow retries at a later time. IP-SM-GW then forwards the SM to SMSC for storage and forward operation; or 8c) Terminating IMS network is successful delivering the SM toward the designated recipient. At 9, a proper response report as determined in step 8a, 8b, or 8c is returned back to UE-A. For 8a, the response indicates to the UE-A that SMS to this recipient is failed permanently. For 8b, the response is the Submit report received from the SMSC. For 8c, the response indicates a successful delivery of the SM to the recipient.

Figure 2A:
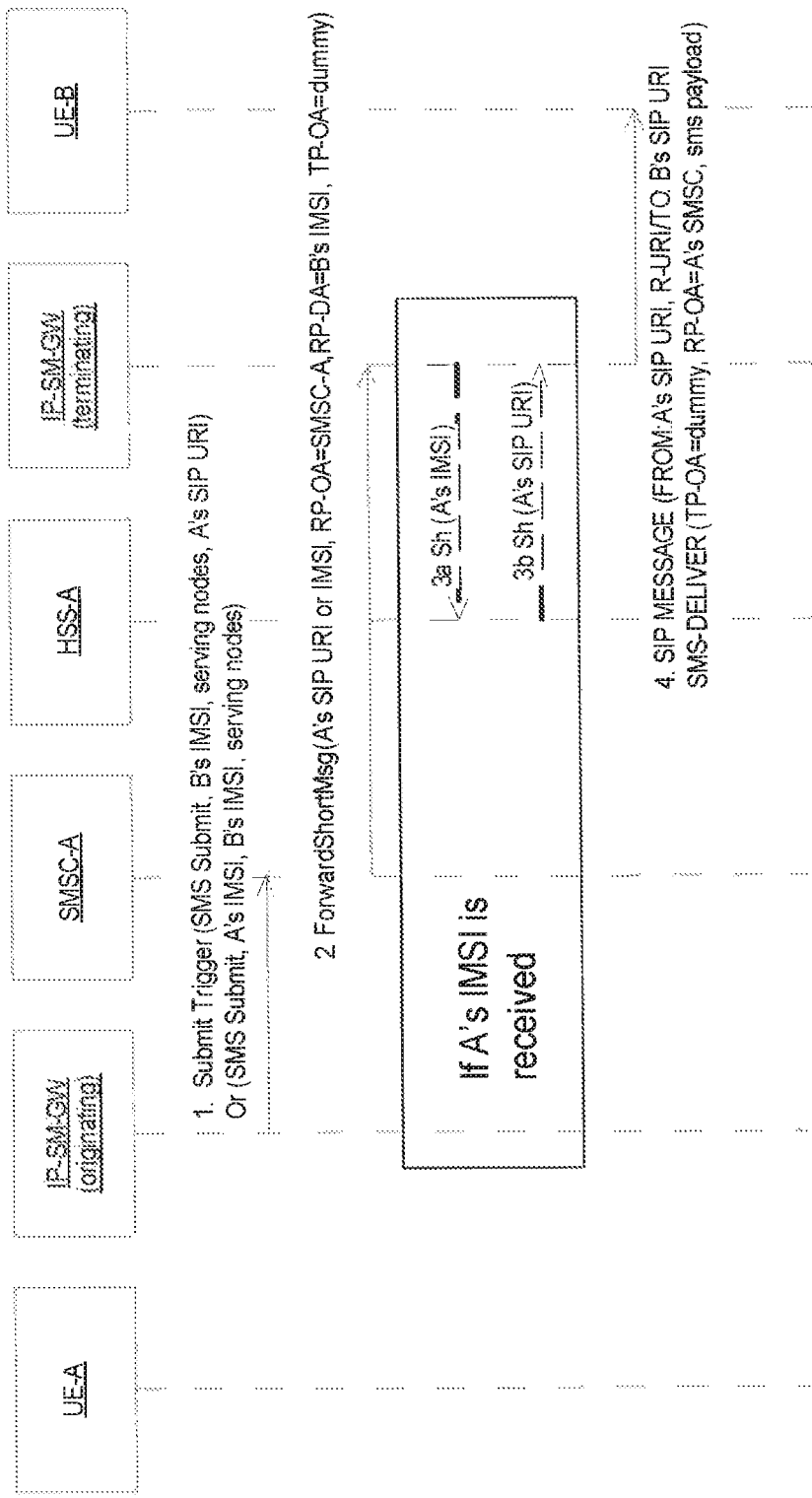
FIG. 2a illustrates a signaling diagram according to another embodiment.

FIG. 2a illustrates a signaling diagram showing how the SMSC-A delivers the SMS toward the UE-B, according to one embodiment. Step 1 of FIG. 2a corresponds to the submit part illustrated in FIG. 1a discussed above. At step 2 of FIG. 2a, the SMSC-A selects the IP-SM-GW-B for delivery and sends the SMS with forwardshortMsg to IP-SM-GW-B. This message includes UE-A's SIP URI or IMSI. The TP-OA field is filled with a value that indicates the recipient UE (e.g., UE-B) is addressed without MSISDN. For example, in one embodiment, this may be done by setting the TP-OA field may be set to some dummy value (e.g., 000s). At step 3, the IP-SM-GW-B is aware that UE-A does not have a MSISDN because of the dummy value in the TP-OA field or the inclusion of UE-A's SIP URI. If only the IMSI is received, the IP-SM-GW-B queries the HSS-A for UE-A's SIP URI via, for example, the Sh interface.

At step 4 of FIG. 2a, the IP-SM-GW-B delivers the SIP MESSAGE to UE-B as in step 4b of FIG. 1a, except that the IP-SM-GW-B may use the SIP URI (i.e. external identifier)—IMSI binding in HSS, and converts the IMSI-B to UE-B's SIP URI by querying the HSS. If IP-SM-GW-B has this SIP-URI to IMSI binding information stored (e.g., from previous HSS query) then this additional HSS query is not needed. The IP-SM-GW-B is aware that the UE-B is capable to decode SMS from MSISDN-less UE (i.e, the capabilities of UE-B have been informed earlier, e.g., a new feature tag in SIP REGISTER and 3rd party registration procedure). A new indication in SIP MESSAGE may be used to inform the UE-B that this SMS is from a MSISDN-less UE.

In some embodiments, UE-B does not use the TP-OA value. Rather, UE-B may use the p-asserted-identity header to determine the sender's (UE-A) identity as explained above.

In some embodiments, UE-B may use the dummy value in TP-OA to determine that the first p-asserted-identity header carries the address of IP-SM-GW-B and the other p-asserted-identity headers carry the sender's identity (i.e, UE-A).

In some embodiments, the IP-SM-GW-B may fill the TP-OA with a dummy value which indicates to the UE-B that the sender's SIP URI is carried in other SIP header, for example, in Referred-By.

For the Deliver-report, the existing mechanism as defined in TS 23.040 and TS 24.341 can be reused, as it does not use MSISDN for message acknowledgment. The only difference may be that, since the UE-B does not have MSISDN or tel URI, the IP-SM-GW-B receives the UE-B's SIP URI in the p-associated-identity in the MESSAGE which carries the deliver-report, and the IP-SM-GW-B may need to use the UE-B's SIP URI to bind the deliver-report to the previous SMS-deliver. It should be noted that this requirement applies also to MSISDN-less T4 in TS 23.682 when SMS-over-IP is used.

For the submit-report, the existing mechanism as defined in TS 23.040 can be reused, as it does not use MSISDN for message acknowledgment. The only difference is that since the UE-A does not have MSISDN or tel URI, the IP-SM- GW-A may need to use the UE-A's SIP URI in the R-URI in the MESSAGE which carries the submit-report.

For the status-report, a similar mechanism is used as with SMS-deliver and discussed above. The only difference may be that the status-report does not contain the TP-OA, but instead contains the TP-RA (recipient address) which currently must be an MSISDN of the original recipient of the SMS which delivery status is reported. The SMSC is only aware of the destination's (e.g., UE-B) IMSI. Therefore, the SMSC can use the IMSI in the TP-RA, which is also an extension to mobile application part (MAP), but similar to what is required in any case for MSISDN-less operation of SMS delivery also in TS 23.682. When the IP-SM-GW receives the status-report from SMSC, it may need to make a similar reverse-HSS query as with option 3 in FIG. 1a, to convert the IMSI to SIP URI. In an embodiment, the IP-SM-GW fills the TP-RA with a dummy value which indicates to the UE that the SIP URI is carried in SIP headers, for example, in Referred-By.

For the Alert-SC procedure, currently the required MAP service between HLR and MSC/SGSN/IP-SM-GW requires the use of MSISDN or MSISDN-alert (i.e., when IMSI has multiple MSISDN) to identify the SMS to be re-sent. This MAP service includes: MAP-ALERT-SERVICE-CENTRE service, MAP-INFORM-SERVICE-CENTRE, MAP-REPORT-SM-DELIVERY-STATUS service. According to one embodiment, the MAP is enhanced to carry UE-B's SIP URI and the existing MSISDN or MSISDN-alert is set to a dummy value (e.g., 0s).

For the IMS solution space, the IP-SM-GW-B can use the Sh interface to set the Message Waiting Flag active in UE-B's HSS when SMS delivery failed. When UE-B is again active or indicates that its memory is again available for receiving SMS, the IP-SM-GW-B can inform UE-B's HSS to retry. For retrying, HSS informs SMSC-A with UE-B's IMSI and SMSC-A and step 2 of FIG. 2a is repeated. It is noted that this requirement regarding the Alert-SC applies also to MSISDN-less T4 in TS 23.682.

With regards to the sharing of IMS identities among multiple devices, according to the current IMS specifications, it is possible that the SIP URI (IMS public user identity) is shared among multiple IMS clients. The same applies also for Tel URI, which may be shared in IMS domain; although in CS domain it is bound to a single IMSI and, therefore, a single device. The current SMS over IP (TS 24.341) solves this in the following way: the MT SMS-deliver is never forked in IMS (this is ensured by setting the "no-fork" directive into the MESSAGE). This means the MESSAGE carrying the SMS-deliver is delivered only to one device. In a similar manner, the SMS-status-report is sent only to one device, which may not even be the same one which originally sent the SMS whose status is being reported. The SMS-submit-report is sent to all registered devices, but the devices which did not submit the original SMS are able to ignore the report by the Call-id in the In-Reply-To header in the MESSAGE which carries the SMS-submit-report.

Figure 2B:
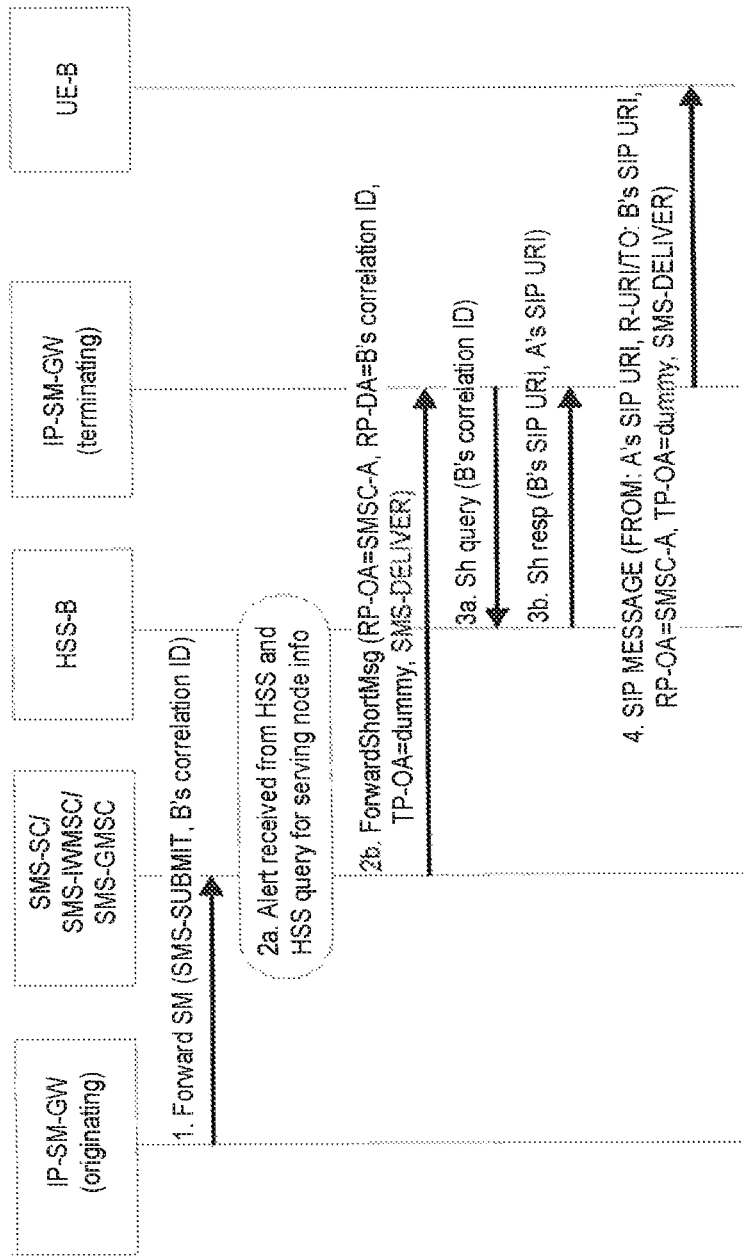
FIG. 2b illustrates a signaling diagram according to another embodiment.

FIG. 2b illustrates an example of a signaling diagram depicting the SMS being forwarded to the SMSC for delivery, according to an embodiment. For instance, the SMS may need to be forwarded to the SMSC for delivery when direct delivery fails (e.g., step 8b in FIG. 1c) or for any other reason that may require re-delivery of the SMS. As illustrated in FIG. 2b, at 1, the IP-SM-GW may forward the SM along with the correlation ID received in step 8b of FIG. 1c to SMS-SC/SMS-IWMSC. At 2a, SMS-SC/SMS-GMSC may receive a trigger to re-deliver the SMS from HSS and query the HSS for serving node information using the correlation ID. In one embodiment, the correlation ID points toward the IP-SM-GW at the terminating network. At 2b, the SMS-GMSC may forward the SM to the IP-SM-GW using the address received from HSS in step 2a. Then, at 3a and 3b, the IP-SM-GW (terminating) may query the HSS to retrieve the sender and receiver identities (SIP-URI) corresponding to this correlation ID. The IP-SM-GW (terminating) may deliver the SM to UE-B via the SIP MESSAGE, at 4.

Figure 2C:
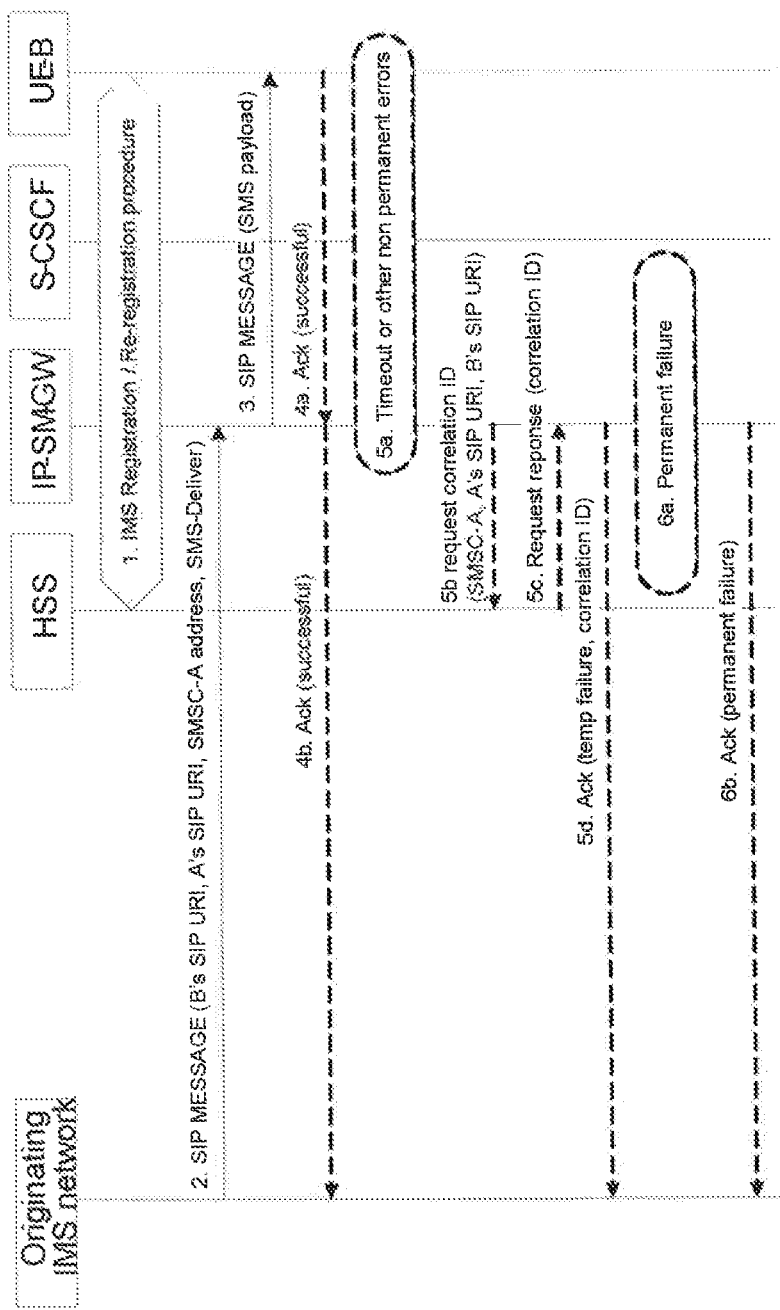
FIG. 2c illustrates a signaling diagram according to another embodiment.

FIG. 2c illustrates an example of a signaling diagram depicting a short message terminating procedure without MSISDN, according to one embodiment. As illustrated the example of FIG. 2c, at 1, the UE-B registers to the S-CSCF according to the IMS registration procedure. At 2, the originating IMS network which received the SM from the UE-A may forward the Short Message (SMS-DELIVER) to the terminating IMS network, where it reaches the IP-SM-GW responsible for UE-B. Then, at 3, if local policy allows MSISDN-less SMS operation, the IP-SM-GW may attempt to deliver the SM to UE-B. At 4a and 4b, when the SM is successfully delivered to UE-B, a success delivery report may be sent to the originating IMS network. If, at 5a, the IP-SM-GW tried to deliver the SM but encountered some error (e.g., UE is memory full, UE not reachable, etc) then, at 5b, the IP-SM-GW may request the HSS for a MSISDN-less SMS Correlation ID. In this example, HSS stores the SMSC-A address, UE-A's SIP URI and UE-B's SIP URI. HSS also marks the message waiting flag with the SMSC-A address. Then, at 5c, the HSS returns the MSISDN-less SMS Correlation ID to IP-SM-GW and, at 5d, the IP-SM-GW returns this to originating IMS network along with an indication of temporary failure. If, at 6a, the IP-SM-GW refuses the MSISDN-less SMS operation due to local policy or other permanent errors (e.g. protocol error) then, at 6b, the IP-SM-GW returns a permanent error indication to the originating IMS network.

Figure 3:
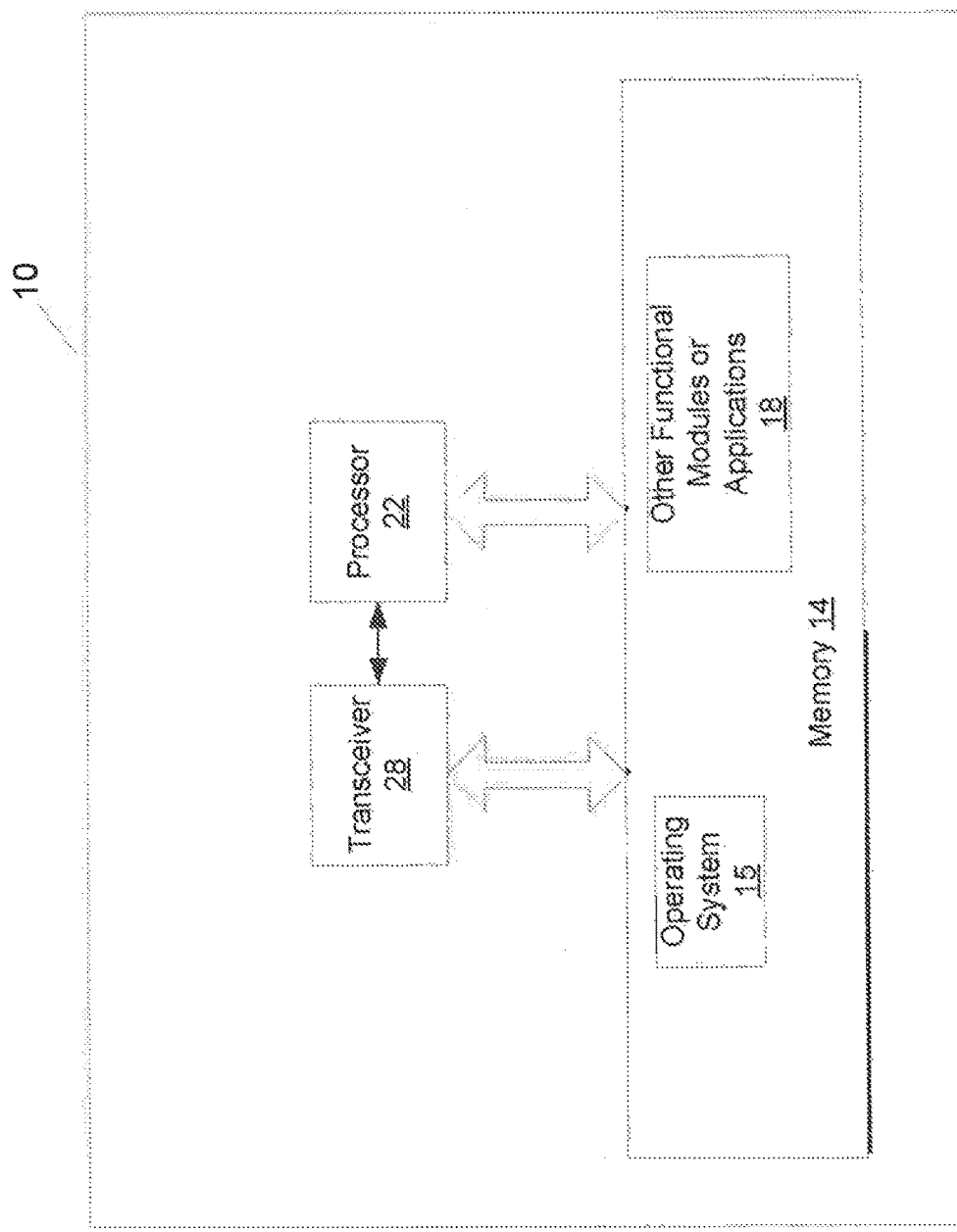
FIG. 3 illustrates an apparatus according to an embodiment.

FIG. 3 illustrates an apparatus 10 according to another embodiment. In an embodiment, apparatus 10 may be network element, such as a gateway, service center, control function, subscription server, etc. In other embodiments, apparatus 10 may be a mobile device such as user equipment (UE). It should be noted that FIG. 3 does not necessarily illustrate all components of apparatus 10. Only those components necessary for understanding embodiments of the invention are illustrated, but one of ordinary skill in the art would understand that apparatus 10 may include additional components that are not illustrated.

Apparatus 10 includes a processor 22 for processing information and executing instructions or operations. Processor 22 may be any type of general or specific purpose processor. While a single processor 22 is shown in FIG. 3, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 further includes a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

In one embodiment, apparatus 10 may be IP-SM-GW-A illustrated in FIG. 1 discussed above. In this embodiment, apparatus 10 may be controlled by memory 14 and processor 22 to store the SIP-URI and IMSI for a device sending a SMS in memory 14. Apparatus 10 may then be controlled by memory 14 and processor 22 to receive, via transceiver 28, a SMS from the sending device. The SMS may be, for example, a MO-SMS or MT-SMS, according to certain embodiments.

In an embodiment, the TP-DA field of the MO-SMS is filled with value(s) that indicates the recipient UE is addressed without MSISDN, such as being filled with dummy values, the R-URI is set to PSI, and the "to header" is set to the receiving device's SIP URI. Apparatus 10 may be further controlled by memory 14 and processor 22 to retrieve the receiving device's SIP URI from the "to header," and to query the receiving device's HSS for the IMSI and routing information of the receiving device. Apparatus 10 may then be controlled by memory 14 and processor 22 to receive, via transceiver 28, the requested IMSI and routing information for the receiving device. Apparatus 10 may be further controlled by memory 14 and processor 22 to deliver the SMS to the receiving device directly or to deliver the SMS to the receiving device via the SMSC.

In another embodiment, apparatus 10 may be UE-A illustrated in FIG. 1 discussed above. In this embodiment, apparatus 10 may be controlled by memory 14 and processor 22 to construct a SMS (e.g., MO-SMS or MT-SMS). In an embodiment, apparatus 10 is configured to fill the TP-DA field of the SMS with value(s) that indicates the recipient UE is addressed without MSISDN, such as dummy values, to set the R-URI to PSI, and to set the "to header" to the receiving device's SIP URI. Apparatus 10 may then be controlled by memory 14 and processor 22 to send, via transceiver 28, the SMS to a gateway.

In another embodiment, apparatus 10 may be the IP-SM-GW-B illustrated in FIG. 1 discussed above. In this embodiment, apparatus 10 may be controlled by memory 14 and processor 22 to receive a message, such as a forwardshortMsg, from a SMSC. According to an embodiment, the message may include the SIP URI and/or IMSI of the device sending the SMS. Apparatus 10 may then be controlled by memory 14 and processor 22 to deliver a SIP message to the destination device. In an embodiment, the delivering of the SIP message may be performed using the SIP URI-IMSI binding that was stored during registration of the destination device. As discussed above, however, the functionality of the IP-SM-GW-B may be combined with the IP-SM-GW-A in a single IP-SM-GW.

In another embodiment, apparatus 10 may be UE-B illustrated in FIG. 1 discussed above. In this embodiment, apparatus 10 may be controlled by memory 14 and processor 22 to receive, from the gateway, the SIP message including a SMS sent from a sending device without MSISDN. Apparatus 10 may then be controlled by memory 14 and processor 22 to decode the SMS and use the p-asserted-identity header to determine the identity of the sending device.

Figure 4:
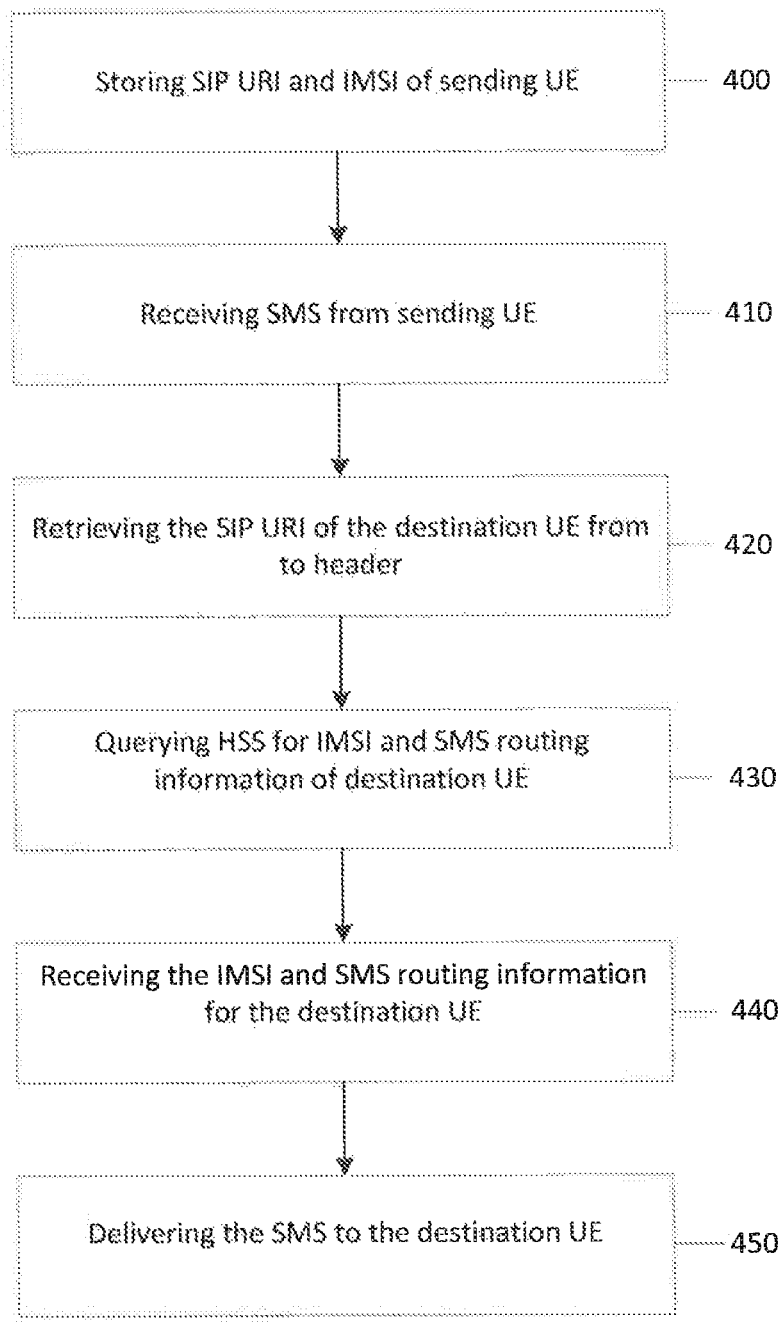
FIG. 4 illustrates a flow diagram of a method according to one embodiment.

FIG. 4 illustrates a flow diagram of a method according to one embodiment. In one embodiment, the method of FIG. 4 may be performed by the IP-SM-GW-A illustrated in FIG. 1 discussed above. The method includes, at 400, storing the SIP-URI and IMSI for a device sending a SMS. The method may further include, at 410, receiving a SMS (e.g., MO-SMS or MT-SMS) from the sending device. In an embodiment, the TP-DA field of the MO-SMS is filled with value(s) that indicates the recipient UE is addressed without MSISDN, such as dummy values, the R-URI is set to PSI, and the "to header" is set to the receiving device's SIP URI. At 420, the method may include retrieving the receiving device's SIP URI from the "to header," and, at 430, querying the receiving device's HSS for the IMSI and routing information of the receiving device. The method may then include, at 440, receiving the requested IMSI and routing information for the receiving device. The method may further include, at 450, delivering the SMS to the receiving device directly or delivering the SMS to the receiving device via the SMSC.

Figure 5:
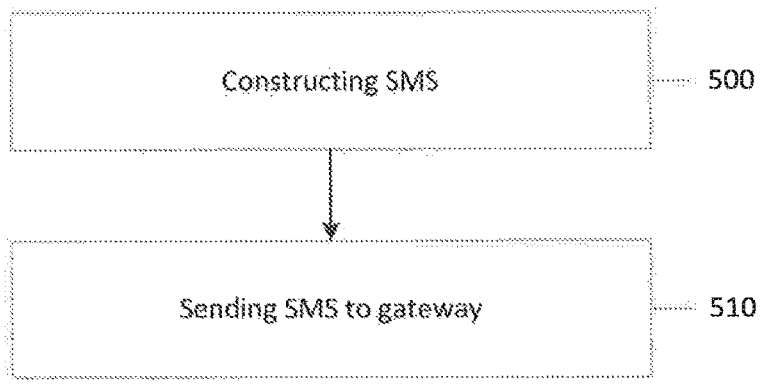
FIG. 5 illustrates a flow diagram of a method according to another embodiment.

FIG. 5 illustrates a flow diagram of a method according to one embodiment. In one embodiment, the method of FIG. 5 may be performed by the UE-A illustrated in FIG. 1. According to one embodiment, the method includes, at 500, constructing a SMS (e.g., MO-SMS or MT-SMS). The constructing may include filling the TP-DA field of the SMS with value(s) that indicates the recipient UE is addressed without MSISDN, such as dummy values, setting the R-URI to PSI, and setting the "to header" to the receiving device's SIP URI. The method may further include, at 510, sending the SMS to a gateway.

Figure 6:
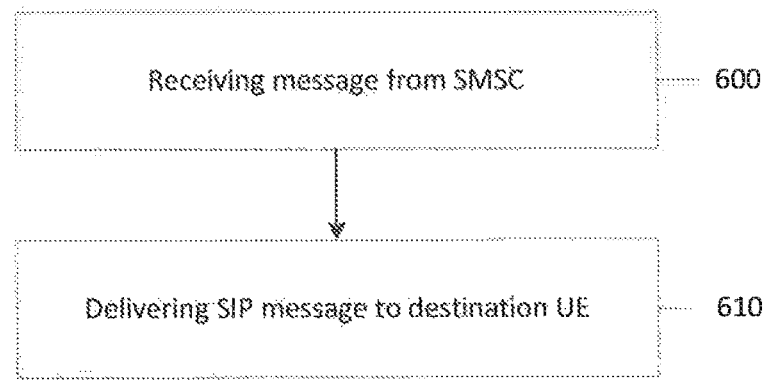
FIG. 6 illustrates a flow diagram of a method according to another embodiment.

FIG. 6 illustrates a flow diagram of a method according to one embodiment. In one embodiment, the method may be performed by the IP-SM-GW-B illustrated in FIG. 1 discussed above. According to one embodiment, the method may include, at 600, receiving a message, such as a forwardshortMsg, from a SMSC. In an embodiment, the message may include the SIP URI and/or IMSI of the device sending the SMS. The method may then include, at 610, delivering a SIP message to the destination device. In an embodiment, the delivering of the SIP message may be performed using the SIP URI-IMSI binding that was stored during registration of the destination device.

Figure 7:
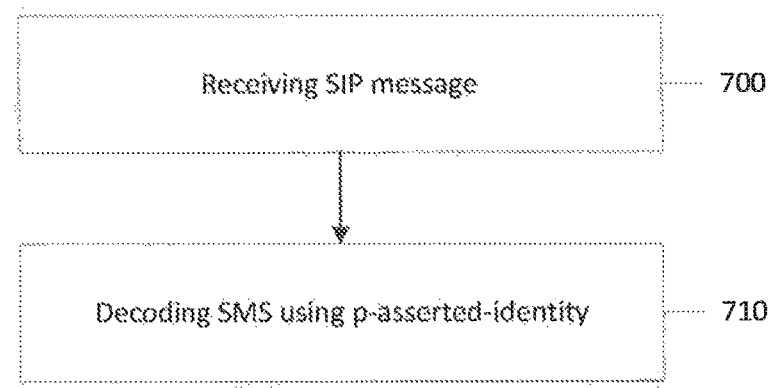
FIG. 7 illustrates a flow diagram of a method according to another embodiment.

FIG. 7 illustrates a flow diagram of a method according to one embodiment. In one embodiment, the method may be performed by the UE-B illustrated in FIG. 1 discussed above. The method may include, at 700, receiving, from the gateway, the SIP message including a SMS sent from a sending device without MSISDN. The method may then include, at 710, decoding the SMS and using the p-asserted-identity header to determine the identity of the sending device.

In some embodiments, the functionality of any of the methods described herein may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

Embodiments of the invention may impact the MAP protocol in order to include UE-A's IMSI or SIP URI (or both) from the IP-SM-GW to SMSC. However, this allows the SMS payload and SMS protocol (e.g., RP/TP field, TS 23.040) to remain untouched. Additionally, the addition imposed by embodiments of the invention for the SMS delivery is feasible with Diameter if MAP is out of the question.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
constructing, by a transmitting user equipment, a short message,
wherein the constructing comprises
filling a transfer protocol destination address field of the short message with a value, wherein the value is configured to indicate that the short message is addressed without a mobile station international subscriber directory number of a receiving user equipment that is a recipient of the short message,
setting a request uniform resource identifier to a public service identity, and
setting a "to header" of the short message to a session initiation protocol uniform resource identifier of the receiving user equipment; and
sending, by the transmitting user equipment, the short message to a core network.

2. The method according to claim 1, wherein the user equipment does not have a mobile station international subscriber directory number.

3. The method according to claim 1, wherein the short message comprises a mobile originated short message service or a mobile terminated short message service.

4. The method according to claim 1, wherein the gateway comprises an internet protocol short message gateway.

5. An apparatus, comprising:
at least one processor; and
at least one memory comprising computer program code,
the at least one memory and the computer program code configured, with the at least one processor, to cause the apparatus at least to
construct a short message,
wherein the constructing comprises
filling a transfer protocol destination address field of the short message with a value, wherein the value is configured to indicate that the short message is addressed without a mobile station international subscriber directory number of a receiving user equipment that is a recipient of the short message,
setting a request uniform resource identifier to public service identity, and
setting a "to header" of the short message service to a session initiation protocol uniform resource identifier of the receiving user equipment; and
send the short message to a core network.

6. The apparatus according to claim 5, wherein the apparatus comprises a user equipment, and wherein the user equipment does not have a mobile station international subscriber directory number.

7. The apparatus according to claim 5, wherein the short message comprises a mobile originated short message service or a mobile terminated short message service.

8. The apparatus according to claim 5, wherein the gateway comprises an internet protocol short message gateway.

9. A computer program, embodied on a non-transitory computer readable medium, the computer program configured to control a processor to perform a process, comprising:
constructing a short message,
wherein the constructing comprises
filling a transfer protocol destination address field of the short message with a value, wherein the value is configured to indicate that the short message is addressed without a mobile station international subscriber directory number of a receiving user equipment that is a recipient of the short message,
setting a request uniform resource identifier to public service identity, and
setting a "to header" of the short message service message to a session initiation protocol uniform resource identifier of the receiving user equipment; and
sending the short message to a core network.

* * * * *